United States Patent [19]
Kirby et al.

[11] Patent Number: 6,083,452
[45] Date of Patent: Jul. 4, 2000

[54] NEAR NET SHAPE FABRICATION OF CERAMIC RADOMES

[75] Inventors: Kevin W. Kirby, Calabasas; Anthony T. Jankiewicz, Upland; Reid F. Lowell, Ontario; Robert L. Hallse, Coronado, all of Calif.

[73] Assignee: Raytheon Company, Lexington, Mass.

[21] Appl. No.: 09/233,739

[22] Filed: Jan. 20, 1999

[51] Int. Cl.[7] ........................ C04B 33/28; C04B 35/634
[52] U.S. Cl. ........................ 264/635; 264/632; 264/633; 264/636; 264/670; 264/678
[58] Field of Search .................... 264/621, 632, 264/633, 636, 670, 635, 678

[56] References Cited

U.S. PATENT DOCUMENTS

| | | | |
|---|---|---|---|
| 3,917,773 | 11/1975 | Gates | 264/628 |
| 4,894,194 | 1/1990 | Janney . | |
| 5,028,362 | 7/1991 | Janney et al. . | |
| 5,419,860 | 5/1995 | Menchhofer | 264/109 |
| 5,627,542 | 5/1997 | Paquette | 264/668 |
| 5,665,440 | 9/1997 | Menchhofer . | |
| 5,948,348 | 9/1999 | Semff | 264/624 |

*Primary Examiner*—James Derrington

[57] ABSTRACT

A radome is fabricated by mixing a mass of ceramic powders, a dispersant chemical, a prepolymer material, and a solvent together to form a casting mixture, which is then cast into a mold having the shape of a radome. The prepolymer material in the casting mixture is cured, and the casting mixture is dried. The molded article is heated to a burnout temperature sufficiently high to vaporize the prepolymer material and the dispersant chemical, and thereafter the molded article is heated to a sintering temperature sufficiently high to sinter the ceramic particles.

18 Claims, 2 Drawing Sheets

NEAR NET SHAPE FABRICATION OF CERAMIC RADOMES

BACKGROUND OF THE INVENTION

This invention relates to radomes, and, more particularly, to the fabrication of ceramic radomes.

Many missiles and aircraft carry onboard radar sets for surveillance or targeting purposes. The radar set includes a transceiving antenna that is mounted to the airframe and points outwardly. The antenna is covered with a protective structure, generally termed a radome, to protect it against aerodynamic forces and against damage by foreign objects encountered during flight.

The radome must have sufficient structural strength and fracture resistance to withstand the aerodynamic forces and foreign object impingement, and it should offer minimal aerodynamic resistance. The radome also must cause minimal attenuation and distortion of the outgoing and incoming radar energy. These requirements are readily met by conventional nonmetallic materials for radomes used on aircraft flying at relatively low speeds.

When the radome protects a forward-facing radar antenna of a high-speed missile or aircraft, such as one which flies faster than several times the speed of sound in the atmosphere, the radome is heated during service to high temperatures by aerothermal friction. It is therefore necessary to fabricate and employ a ceramic radome.

In one fabrication approach, large ceramic radomes are conventionally fabricated by forming a mixture of a binder and a mass of ceramic particles, casting this "slip" to shape in a mold, drying the slip, vaporizing the binder, and sintering the ceramic particles. The drying operation requires a long period of time wherein the water in the slip diffuses out of the molded article, through a porous wall mold. Water soluble species in the molded article migrate with the water, producing inhomogeneities and density gradients in the material. The resulting dried "green" body has very little strength and is quite fragile, and is therefore easily damaged in the subsequent process steps. One characteristic of the fabrication of large ceramic articles by such slip casting is that the attainment of precise configurations and dimensions is difficult due to excessively large shrinkage and the consequent shape changes and warping that occur during the vaporizing and sintering steps. The resulting distortion is somewhat uncontrollable and often leads to shape variations in the final article that are unacceptable because they adversely affect the aerodynamics of the missile or aircraft. The cost of production of ceramic radomes is therefore high due to a relatively low yield and the cost of machining and reworking to overcome the distortions that occur.

In another fabrication approach for producing a Pyroceram® glass-ceramic material, molten silicate liquid is cast into a mold. The liquid solidifies as a glass. The glass is thermally treated to form a crystalline phase within the glass matrix, resulting in a glass-ceramic material. Because of the nature of the process, the cast radome precursor is typically twice as thick as desired, requiring extensive subsequent machining to reduce the thickness of the blank to that of the final radome.

There is a need for an improved approach to fabricating ceramic radomes that has a greater yield of acceptable articles. The present approach fulfills that need, and further provides related advantages.

SUMMARY OF THE INVENTION

The present invention provides a gel casting method for fabricating ceramic radomes. The approach minimizes the amount of shrinkage that occurs during the fabrication steps, resulting in much smaller distortions than experienced in conventional slip casting processes. The fabrication approach therefore has a higher production yield of acceptable parts, leading to a lower cost per acceptable part. Parts are fabricated to near net shape, so that little if any final machining is required.

In accordance with the invention, a method of fabricating a radome includes providing a mass of ceramic powders, a dispersant chemical, a prepolymer material, and a solvent, and mixing these components together to form a casting mixture. The casting mixture is cast into a mold defining the shape of a radome. The prepolymer material in the casting mixture is cured and the casting mixture is dried, thereby forming a molded article. This cured and dried molded article has a sufficient strength that it may optionally be machined prior to the subsequent processing. The molded article is thereafter heated to a burnout temperature sufficiently high to vaporize the prepolymer material and the dispersant chemical, and then second heated to a sintering temperature sufficiently high to sinter the ceramic particles.

In a preferred approach, the mass of ceramic powders is a mixture of silicon oxide, aluminum oxide, aluminum nitride, and silicon nitride powders, with yttrium oxide powder also desirably present as a sintering aid. The prepolymer material includes an acrylamide, most preferably a mixture of methacrylamide and methylenebisacrylamide. The solvent is water co-solvent. There is also desirably present n-vinylpyrrolidone, which is herein termed a "prepolymer/cosolvent". The n-vinylpyrrolidone participates in the polymerization reaction, becoming part of the cross-linked gel network, and also acts somewhat as a solvent for the acrylamide prepolymers. Desirably, the mixture of ceramic powders, prepolymer material, and solvent has a ratio of the volume of ceramic powders to the volume of prepolymer material and solvent of approximately 1:1, with the result that the shrinkage of the molded article after burnout is about 1 percent and the shrinkage after high-temperature sintering is about 16–17 percent. By contrast, articles prepared by slip casting experience shrinkage of about 25–35 percent during burnout and sintering.

The present approach produces a radome with less shrinkage, and thence less distortion, than experienced with conventional slip casting manufacturing operations. The use of a prepolymer material such as an acrylamide gives the molded article sufficient strength after curing to permit handling and optionally machining prior to the burnout, even with the use of a relatively small amount, preferably about 6 percent by weight of the mass of the ceramic particles, of the prepolymer material in the casting mixture. The use of a relatively small amount of the prepolymer material allows the use of a larger fraction of the mass of ceramic particles, which in turn reduces the amount of shrinkage that occurs during burnout of the organic phase and sintering of the ceramic particles. The presence of the prepolymer also makes the "green" article prior to burnout and sintering more robust and able to withstand normal handling without damage. Consequently, a larger fraction of the fabricated radomes meet dimensional specifications without rework, or less rework is required. The present gel casting approach is also faster and more economical in production operations than slip casting, because the extended drying period for water removal is not required. The irregularities and inhomogeneities characteristic of slip casting are avoided.

Other features and advantages of the present invention will be apparent from the following more detailed descrip-

DETAILED DESCRIPTION OF THE INVENTION

Figure 1:
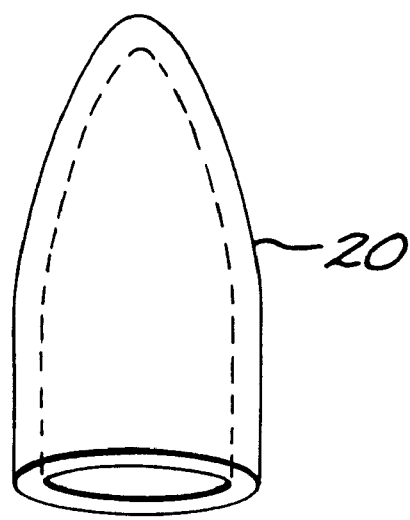
FIG. 1 is a perspective view of a ceramic missile radome.

FIG. 1 depicts a radome 20, which is generally an elongated ogival or conical hollow body that is open at the large end and closed at the small end. The radome 20 is hollow to contain a radar antenna, and is relatively thin-walled. In service, the open end of the radome is joined to the body of a missile to form its nose. In a typical application, the radome is about 18–27 inches long, about 7–13 inches in maximum diameter at its base, and about 0.25 inch in thickness. These dimensions are presented as exemplary, and are not to be taken as limiting of the invention.

Figure 2:
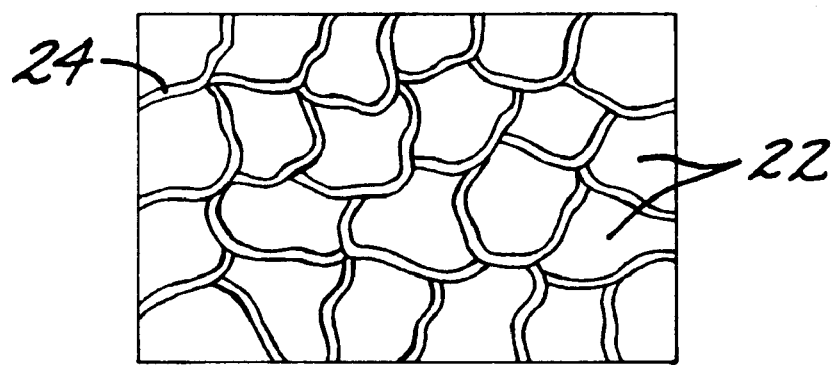
FIG. 2 is an idealized representation of the microstructure of the radome of FIG. 1.

The radome 20 is a unitary ceramic body having a ceramic microstructure throughout. FIG. 2 schematically depicts in general terms the ceramic microstructure, which includes a plurality of ceramic grains 22, optionally with an intergranular glassy phase 24 therebetween. The grains 22 are preferably all of the same composition, or they may have different compositions. The intergranular glassy phase 24, where present, lies in the grain boundaries between the grains 22.

Figure 3:
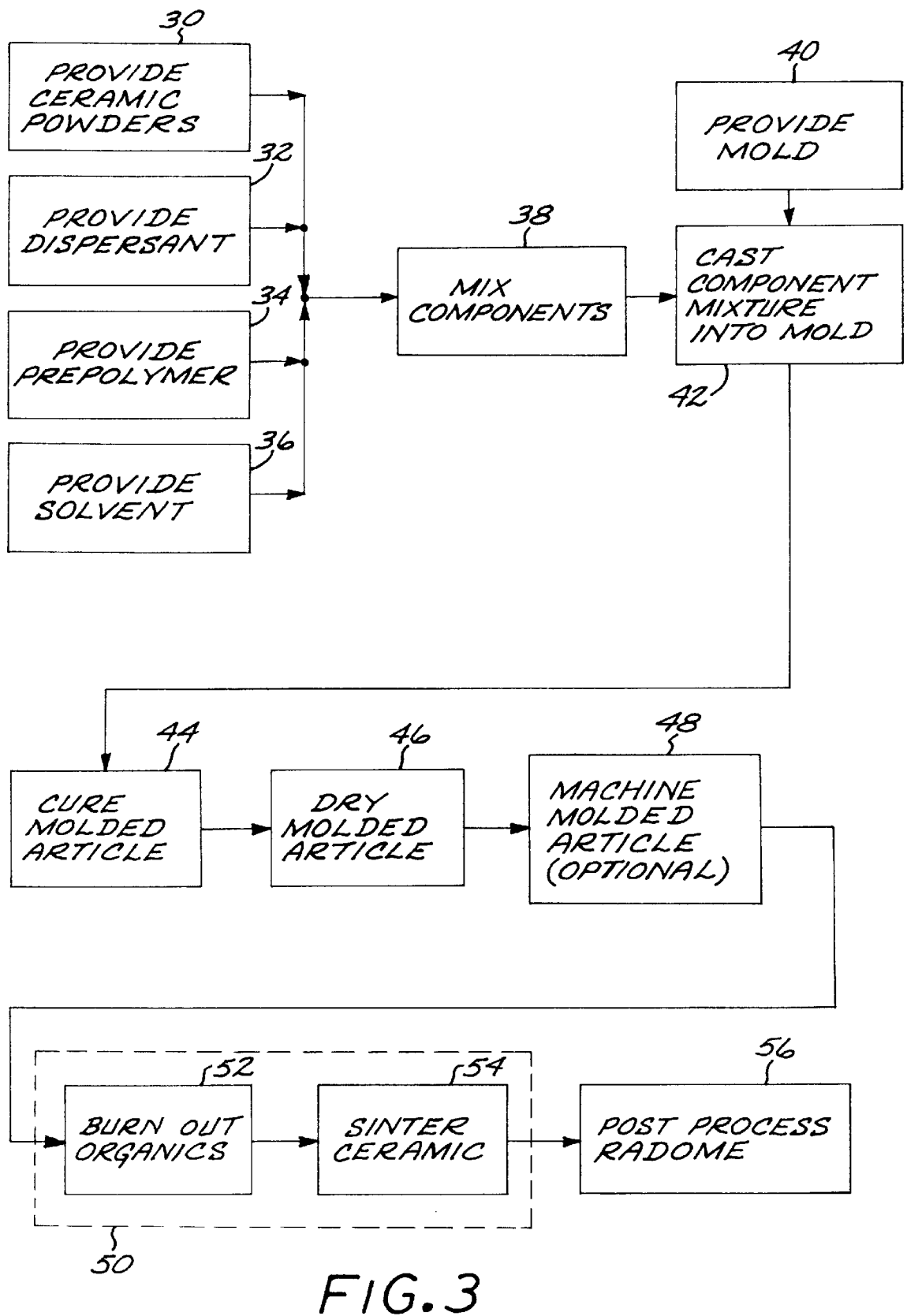
FIG. 3 is a block flow diagram of a preferred approach for practicing the invention.

The presently preferred gel casting approach to fabricating the radome 20 according to the present invention is depicted in FIG. 3. A mass of ceramic powders is provided, numeral 30. A wide variety of types and amounts of such powders may be used, and no limitations are known. Preferably, the powder mass is a mixture of silica ($SiO_2$), aluminum oxide ($Al_2O_3$), aluminum nitride (AlN), and silicon nitride ($Si_3N_4$) powders, with yttrium oxide ($Y_2O_3$) powder also present as a sintering aid. Most preferably, the mass of ceramic particles has a formulation $Si_{6-X}Al_XO_XN_{6-X}$, where $2 \leq X \leq 4$. (Yttrium oxide does not appear in this formulation, as it is present only as a sintering aid.) There is no known limitation on the sizes of the particles, but preferably the powder particles are generally equiaxed and about 5 micrometers in diameter. The ratio of the amounts of the types of the various particles and the total amount of ceramic particles is as selected by the designers of the radome, and does not form a part of the present invention. However, in general it is desired to have as high a volume fraction of ceramic particles in the casting mixture as possible. Studies to date have achieved casting mixtures with at least about 50 volume percent of ceramic particles, preferably about 50–55 volume percent of ceramic particles, but lower and higher amounts are operable as well.

A dispersant chemical is provided, numeral 32. Any conventional surfactant operable with ceramic powders such as a polyelectrolyte, which is available from Mobay Chemical Corp. as Dolapix, and/or anionic surfactants consisting of aromatic or aliphatic phosphate esters, which is available commercially as Emphos.

A prepolymer is provided, numeral 34. As used herein, a "prepolymer" is a material which is a precursor to a final polymer. The preferred prepolymers are monomers, but partially polymerized monomers may also be used if they otherwise are operable in the processing. The preferred prepolymers are acrylamides and pyrrolidones, most preferably a mixture of methacrylamide and methylenebisacrylamide, and n-vinylpyrrolidone prepolymer/co-solvent. In each case, a catalyst and/or initiator recommended for the prepolymer may be required to achieve polymerization. For the preferred prepolymers, a tetramethylenediamine catalyst and an ammonium persulfate initiator are preferred. The ratio of the amount of ceramic powder to the amount of the prepolymer is preferably at least 17:1 by weight, most preferably 17:1 to 18:1 by weight. Smaller ratios of the amount of ceramic powder to the amount of the prepolymer tend to lead to higher porosity, and thence larger shrinkages and greater propensity toward warping in the final product, but may be operable for some applications. The use of higher amounts of ceramic powder tends to reduce the physical integrity of the green compact, and ratios of more than 25:1 by weight of ceramic powder to polymer are not preferred but may be operable for some applications.

A solvent for the prepolymer and the catalyst/initiator, if any, is provided, numeral 36. The solvent dissolves these components and also serves as a casting medium to provide sufficient fluidity for the casting mixture for casting into the casting mold. The selection of the solvent depends upon the prepolymer and catalyst/initiator. For the case of the preferred acrylamide prepolymer and its catalyst/initiator, the preferred solvent is water, with the n-vinylpyrrolidone prepolymer also serving a co-solvent role. The amount of solvent is sufficient to allow subsequent casting. Desirably, the subsequently formed mixture has a ratio of the volume of ceramic powders to the total volume of prepolymer material and solvent of approximately 1:1, although the ratio may be varied as desired to change the consistency of the mixture.

Optionally, additional components may be provided as desirable or necessary. Conventional defoaming agents and surfactants may be used, for example.

The components are mixed together, numeral 38. The mixing typically involves stages of mixing to prepare submixtures, into which additional components are mixed. Specifically, the prepolymer and solvent (and prepolymer/co-solvent, if used) are usually mixed together. The ceramic powders are then added, and the total mixture is mixed and ground in a ball mill. Care is taken not to entrain air into the mixture, but some bubbles are inevitably present. The mixture is de-aired as necessary with a combination of vacuum application and mixing. The catalyst and initiator are added at the end of the mixing. The details of the preferred mixing procedure for the preferred components will be set forth subsequently. The final casting mixture is a slurry of ceramic particles in a flowable carrier containing the prepolymer, the solvent, the prepolymer/cosolvent, the dispersant, and any other additives that are used.

A radome mold is furnished, numeral 40. The mold normally has a female part and a male part, also termed a mandrel. The female part defines the outer surface of the radome 20, and the mandrel defines the inner surface of the radome. The female part is supported with its open end facing upwardly, and the mandrel is supported inside the female part with a gap therebetween. The spacing is made slightly larger than that required for the wall thickness of the radome, to account for shrinkage that occurs during subsequent processing.

The casting mixture is placed into the gap between the female part and the mandrel, by casting the casting mixture into the space between the two mold parts, numeral 42. Care is taken to fill the gap and not to entrap air bubbles in the gap between the two mold parts. In a preferred approach, a measured amount of the casting mixture is placed into the female mold, and then the mandrel is forced downwardly into the casting mixture so that the casting mixture is pushed upwardly in the space between the two mold parts. The gap between the two mold parts is then topped off with additional casting mixture.

The cast mixture is thereafter cured in place, between the two mold parts, to form a molded article, numeral 44. The prepolymer and prepolymer/co-solvent of the cast mixture are cured by any operable procedure. Preferably, the cast mixture is cured at room temperature, or heated slightly to accelerate the curing. In the latter case, the molds are made with heaters therein, or external heaters are used to heat the molds and the enclosed cast mixture. In the case of the preferred acrylamides and catalyst, curing is accomplished in about 1 hour at ambient temperature, without heating the mold. The mandrel is thereafter removed.

The molded and cured article is thereafter dried to remove any solvent remaining from the casting mixture, numeral 46. To dry the article, the temperature may be controlled to cause any water and organic solvent to evaporate, or other drying techniques such as a liquid desiccant may be used. In the air drying approach for the preferred application, drying is accomplished in two stages, first at a temperature of 10–35° C. for 14 hours. The article is removed from the female mold, and further dried for 24 hours at 50° C. and a relative humidity of 35 percent. For the liquid desiccant approach and the preferred case of a water solvent, the liquid desiccant is a long-chain, high molecular weight propylene glycol It is contacted to the surface of the molded article, such that water is dissolved into it from the article. In practice, this dessication is accomplished by removing the male mold (mandrel) with the opening of the female mold and molded article (still in place in the female mold) facing upwardly. The liquid desiccant is poured into the interior of the molded article, and the male mold re-inserted to force the level of the liquid desiccant upwardly into contact with the entire inner surface of the molded article. Water is pulled out of the interior of the molded article into the liquid desiccant. After 2 hours, a peristaltic pump is used to remove the liquid desiccant and dissolved water.

The resulting molded, cured, and dried article is sufficiently strong to be removed from the female mold and readily handled. (By contrast, an article being manufactured by conventional slip casting is, at this point of the processing, quite weak and brittle.) It may also optionally be machined or trimmed, as necessary. That is, the article at this stage is easily rough machined with attachments, holes, and the like, numeral 48, but such rough machining is optional. Rough machining of the green, unsintered, relatively soft article saves a great deal of time and expense in the manufacturing operation, because rough machining of a final, hard sintered article is time-consuming and costly. The rough machining may then be final machined if necessary after subsequent sintering.

The molded article is thereafter heated, numeral 50, to vaporize (burn out) the organics present in the article, numeral 52, and to sinter the remaining ceramic, numeral 54. The steps 52 and 54 are preferably accomplished separately and sequentially, often in different ovens, but may be accomplished in the same continuous heating cycle. The temperatures and times are selected appropriately for the organics and ceramic materials used. For the preferred approach, the burn out step 52 is accomplished at a temperature of 500–600° C., and the sintering step 54 is accomplished at a temperature of 1600–1650° C. Most preferably, the burnout step 52 is accomplished at 600° C. for two hours, and the sintering step 54 is accomplished at 1650° C. for 4 hours.

The sintered radome may be post-processed as necessary, numeral 56. For example, final machining may be performed on the external surface, on the internal surface, and on attachments, connectors, and the like. However, because of the large fraction of ceramic particles in the casting mixture, the shrinkage in the article during burnout and sintering is smaller than experienced in conventional slip casting. Substantially less final post-processing is required than for slip casting articles.

A full size radome has been prepared by the approach of the invention. The mass of ceramic powders weighing 4500 grams included silicon nitride, aluminum nitride, aluminum oxide, silicon dioxide, and yttrium oxide powders. The dispersant was 45 grams of Dolapix and 8.46 grams of Emphos. The prepolymer and prepolymer/co-solvent mixture included 109.47 grams of methacrylamide, 39.47 grams of methylenebisacrylamide, and 109.47 grams of n-vinylpyrrolidone. The catalyst for the prepolymers was 1650 microliters of tetramethylenediamine, and the initiator was 1.65 milliliters of a 10 percent solution of ammonium persulfate in water. The solvent for the prepolymer/cosolvent mixture was 1021.74 grams of deionized water. Additionally, an acetylenic-diol surfactant available commercially as Surfynol was added as a defoaming agents in an amount of 0.5–2.0 milliliter. Optionally, other defoaming agents such as FoamMaster and/or DaPro may be added.

To combine these components, the prepolymer, prepolymer/co-solvent, and solvent were mixed together and added to a ball-mill jar, which already contained silicon nitride grinding media in an amount equal to half the total weight of the mass of ceramic powders. The Dolapix was added to the milling jar and mixed for 5–15 minutes. About 50 percent of the silicon nitride ceramic powder was added to the milling jar and fast-roll mixed for 2 hours. Another 25 percent of the silicon nitride ceramic powder was added and fast-roll mixed for 2 hours. The remaining silicon nitride ceramic powder was added and fast-roll mixed for 2 hours. All of the alumina, silica, and yttria powders were added to the milling jaw and fast-roll mixed overnight for 12–15 hours. The Surfynol and 5–15 grams of nitric acid, as well as any optional FoamMaster and DaPro, were added in stages and mixed into the mixture and fast roll mixed. The pH of the casting mixture was checked and adjusted to less than pH=9.0 with further additions of nitric acid solution, as necessary. Lastly, the aluminum nitride powder was added to the mill jaw and slow roll mixed for 2 hours. The grinding media was removed by filtering.

The casting mixture was de-aired in vacuum in several stages, with intermediate additions of surfactant to aid in bubble removal. The ammonium persulfate solution was added prior to the last vacuum dessication stage.

The mold parts, made of aluminum, were cleaned with soapy water and a scratchy pad to remove any prior residue, and wiped clean with a towel. The mold surfaces was cleaned with acetone followed by isopropyl alcohol, and dried. The mold surface was sprayed or wiped with polyester parafilm release agent. The two mold halves were aligned with guide rods.

The casting mixture was slowly and carefully added to the upturned female mold, taking care to avoid entrapping air in the mixture. The mandrel was lowered into place.

The female mold, mandrel, and casting mixture captured between the two mold parts were held at room temperature for 1 hour to cure the prepolymer. The mandrel was removed. The female mold and cured casting mixture were heated to 10–35° C. for 14 hours to dry the cured casting mixture. The part was then carefully removed from the female mold and further dried at 50° C. for 24 hours in a relative humidity of 35 percent.

Binder burnout was accomplished in an oven by heating the molded article at a rate of 5° C. per minute to 600° C., maintaining the article at 600° C. for 2 hours, and then cooling at a rate of 3° C. per minute to room temperature.

Sintering was accomplished in an oven by heating the molded article at a rate of 5° C. per minute to 1650° C., maintaining the article at 1650° C. for 4 hours, and then cooling at a rate of 5° C. per minute to room temperature.

The resulting ceramic radome was of excellent quality and suitable for use.

Test specimens were also prepared using this same procedure. The specimens were analyzed for structure and tested for properties. The microstructure was about 94.24 weight percent of β'-SiAlON phase forming the grains 22, and the remainder the intergranular glassy phase 24 formed of yttria, silica, alumina, and small amounts of other constituents, generally as depicted in FIG. 2. The dielectric constant of the ceramic was 6.84 at 26° C. and 9.375 GHz, 6.98 at 1200° C. and 9.375 GHz, 7.4 at 26° C. and 35 GHz, and 8.1 at 1170° C. and 35 GHz. The modulus of elasticity was $30–33 \times 10^6$ psi at 26° C., the flexure strength was 38,000 psi at 26° C., and the thermal expansion coefficient was $1.8 \times 10^{-6}$ in/in/°C. over the temperature range of 26° C. to 260° C.

The present gel casting approach has important advantages over conventional slip casting. The fraction of ceramic particles in the cast mixture is greater in gel casting, leading to less shrinkage and warping in the final product. Correspondingly, there is less water to be removed in the gel casting approach than in slip casting, reducing the processing time to remove the water. The green gel cast article is stronger than the green slip cast article, so that rough machining or other processing of the green article is possible to reduce final machining time and expense. The gel casting may be accomplished using a reusable aluminum mold set, instead of the plaster mold set typically used in slip casting and which is good for at most only about 3 castings due to erosion of the plaster during casting.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of fabricating a radome, comprising the steps of providing a mass of ceramic powders;

providing a dispersant chemical;

providing a prepolymer material;

providing a solvent;

mixing the mass of ceramic powders, the dispersant chemical, the prepolymer material, and the solvent together to form a casting mixture; thereafter providing a mold defining a shape of a radome that is open at a large end and closed at a small end, the mold including a female mold part oriented with an open end facing upwardly, and a male mold part the male mold part and the female mold part being sized so that the male mold part is received within the female mold part with a gap therebetween; thereafter casting the casting mixture into the gap between the male mold part and the female mold part; thereafter curing the prepolymer material in the casting mixture and drying the casting mixture, with the casting mixture in the gap between the male part and the female part of the mold, thereby forming a molded article; thereafter first heating the molded article to a burnout temperature sufficiently high to vaporize the prepolymer material and the dispersant chemical; and thereafter second heating the molded article to a sintering temperature sufficiently high to sinter the ceramic particles.

2. The method of claim 1, wherein the mass of ceramic powders comprises a mixture of silica, aluminum oxide, aluminum nitride, and silicon nitride powders.

3. The method of claim 2, wherein the mass of ceramic powders further comprises yttrium oxide powder.

4. The method of claim 1, wherein the prepolymer material comprises an acrylamide.

5. The method of claim 1, wherein the prepolymer material comprises a mixture of methacrylamide and methylenebisacrylamide, and n-vinylpyrrolidone.

6. The method of claim 1, wherein the solvent comprises water.

7. The method of claim 1, wherein the dispersant chemical is selected from the group consisting of a polyelectrolyte and an anionic surfactant, and mixtures thereof.

8. The method of claim 1, including an additional step, after the step of curing, and before the step of first heating, of machining the molded article.

9. The method of claim 1, wherein the step of mixing includes the step of providing the mass of ceramic powders, the dispersant chemical, the prepolymer material, and the solvent in amounts such that, after the step of curing but before the step of first heating, the molded article has a ratio of the mass of ceramic powders to the amount of prepolymer material of at least 17:1, by weight.

10. The method of claim 1, wherein the casting mixture has at least about 50 volume percent of ceramic powders.

11. A method of fabricating a radome, comprising the steps of providing a mass of ceramic powders comprising a mixture of silica, aluminum oxide, aluminum nitride, and silicon nitride powders;

providing a dispersant chemical;

providing a prepolymer material comprising an acrylamide;

providing a prepolymer/co-solvent comprising n-vinylpyrrolidone providing a solvent comprising water;

mixing the mass of ceramic powders, the dispersant chemical, the prepolymer material, the prepolymer/co-solvent and the solvent together to form a casting mixture; thereafter providing a mold defining a shape of a radome that is open at a large end and closed at a small end, the mold including a female mold part oriented with an open end facing upwardly, and a male mold part, the male mold part and the female mold part being sized so that the male mold part is received within the female mold part with a gap therebetween; thereafter casting the casting mixture into the gap between the male mold part and the female mold part; thereafter curing the prepolymer material in the casting mixture and drying the casting mixture, with the casting mixture in the gap between the male part and the female part of the mold, thereby forming a molded article, wherein the step of mixing includes the step of providing the mass of ceramic powders, the dispersant chemical, the prepolymer material, and the solvent in amounts such that, during the step of curing but before the step of first heating, the shrinkage of the molded article as compared with the casting mixture is less than about 1 percent; thereafter first heating the molded article to a burnout temperature sufficiently high to vaporize the prepolymer material and the dispersant chemical; and thereafter second heating the molded article to a sintering temperature of about 1650° C. for a time sufficient to sinter the ceramic particles.

12. The method of claim 11, wherein the mass of ceramic powders further comprises yttrium oxide powder.

13. The method of claim 11, including an additional step, after the step of curing, and before the step of first heating, of machining the molded article.

14. The method of claim 11, wherein the prepolymer material comprises a mixture of methacrylamide and methylenebisacrylamide.

15. The method of claim 11, wherein the dispersant chemical is selected from the group consisting of a polyelectrolyte and an anionic surfactant, and mixtures thereof.

16. The method of claim 11, wherein the casting mixture has at least about 50 volume percent of ceramic powders.

17. A method of fabricating a radome, comprising the steps of providing a mass of ceramic powders comprising a mixture of silica, aluminum oxide, aluminum nitride, yttrium oxide, and silicon nitride powders;

providing a dispersant chemical selected from the group consisting of a polyelectrolyte and an anionic surfactant, and mixtures thereof;

providing a prepolymer material comprising a mixture of methacrylamide and methylenebisacrylamide;

providing a prepolymer/co-solvent comprising n-vinylpyrrolidone providing a solvent comprising water; thereafter mixing the mass of ceramic powders, the dispersant chemical, the prepolymer material, the prepolymer/co-solvent, and the solvent together to form a casting mixture, the ratio of the mass of ceramic powders to amount of prepolymer material being about 17–18 to 1, by weight; thereafter providing a mold defining a shape of a radome that is open at a large end and closed at a small end, the mold including a female mold part oriented with an open end facing upwardly, and a male mold part the male mold part and the female mold part being sized so that the male mold part is received within the female mold part with a gap therebetween; thereafter casting the casting mixture into the gap between the male mold part and the female mold part; thereafter curing the prepolymer material at room temperature with the casting mixture in the gap between the male part and the female part of the mold; thereafter drying the cured casting mixture, thereby forming a molded article; thereafter first heating the molded article to a burnout temperature of from about 500° C. to about 600° C. to vaporize the prepolymer material and the dispersant chemical; and thereafter second heating the molded article to a sintering temperature of from about 1600° C. to about 1650° C. for a time sufficient to sinter the ceramic particles.

18. The method of claim 17, wherein the casting mixture has at least about 50 volume percent of ceramic powders.

* * * * *